United States Patent
Sharma et al.

(10) Patent No.: US 12,532,218 B2
(45) Date of Patent: Jan. 20, 2026

(54) WIRELESS DATA LINK LAYER COMPRESSION AND DECOMPRESSION

(71) Applicant: Sony Group Corporation, Tokyo (JP)

(72) Inventors: Vivek Sharma, Basingstoke (GB);
Hideji Wakabayashi, Basingstoke (GB); Yuxin Wei, Basingstoke (GB); Yassin Aden Awad, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 575 days.

(21) Appl. No.: 17/918,580

(22) PCT Filed: Mar. 15, 2021

(86) PCT No.: PCT/EP2021/056517
§ 371 (c)(1),
(2) Date: Oct. 13, 2022

(87) PCT Pub. No.: WO2021/233587
PCT Pub. Date: Nov. 25, 2021

(65) Prior Publication Data
US 2023/0140866 A1    May 11, 2023

(30) Foreign Application Priority Data
May 19, 2020   (EP) .................................... 20175569

(51) Int. Cl.
*H04W 28/06*    (2009.01)
*H04L 69/04*    (2022.01)
(Continued)

(52) U.S. Cl.
CPC ............. *H04W 28/06* (2013.01); *H04L 69/22* (2013.01); *H04L 69/324* (2013.01)

(58) Field of Classification Search
None
See application file for complete search history.

(56) References Cited

U.S. PATENT DOCUMENTS 10,205,660 B2 * 2/2019 Cox ...................... H04L 69/325
2004/0034717 A1   2/2004 Pelletier et al.
(Continued)

FOREIGN PATENT DOCUMENTS

CN      107707401 A     2/2018
WO   WO-2004072763 A2   8/2004
(Continued)

OTHER PUBLICATIONS

International Search Report and Written Opinion mailed on May 18, 2021, received for PCT Application PCT/EP2021/056517, filed on Mar. 15, 2021, 13 pages.
(Continued)

*Primary Examiner* — Duc T Duong
(74) *Attorney, Agent, or Firm* — XSENSUS LLP

(57) ABSTRACT

A method of processing data frames for transmission on a wireless access interface of a wireless communications system, the method comprising receiving a first data frame comprising a first protocol header, the first protocol header associated with a medium access control (MAC) frame format for data transmission within a local area network (LAN), applying header compression in accordance with a header compression context to the first data frame by compressing one or more protocol header fields of the first protocol header to form a first compressed data frame for transmission on the wireless access interface, receiving a second data frame comprising a second protocol header associated with the MAC frame format, and determining that none of the fields of the second protocol header are to be compressed in accordance with the header compression context before the second data frame is transmitted on the wireless access interface.

20 Claims, 9 Drawing Sheets

(51) Int. Cl.
*H04L 69/22* (2022.01)
*H04L 69/324* (2022.01)

(56) References Cited

U.S. PATENT DOCUMENTS

| | | | | |
|---|---|---|---|---|
| 2005/0207408 A1* | 9/2005 | Elliott | .................. | H04L 69/04 370/389 |
| 2011/0306309 A1* | 12/2011 | Yabe | .................. | H04L 69/04 455/72 |
| 2014/0369365 A1* | 12/2014 | Denio | .................. | H04L 69/16 370/474 |
| 2016/0135095 A1* | 5/2016 | Wu | .................. | H04W 28/06 370/328 |
| 2016/0142932 A1* | 5/2016 | Ahmadzadeh | .... | H04W 28/0236 370/328 |
| 2019/0297019 A1* | 9/2019 | Mudireddy | .......... | H04L 47/26 |
| 2021/0219174 A1* | 7/2021 | Xu | .................. | H04L 69/324 |
| 2021/0266385 A1* | 8/2021 | Lu | .................. | H04L 69/04 |

FOREIGN PATENT DOCUMENTS

| | | |
|---|---|---|
| WO | 2018/014729 A1 | 1/2018 |
| WO | 2020/165229 A1 | 8/2020 |

OTHER PUBLICATIONS

3GPP, "Study on NR Industrial Internet of Things (IoT); (Release 16)", 3GPP TR 38.825 v16.0.0, Mar. 2019, pp. 1-33.

Sony, "Ethernet Header Compression additional requirements", 3GPP TSG RAN WG2 Meeting# 105, R2-1901424, Feb. 25-Mar. 2, 2019, 2 pages.

Sony, "Feedback and profile ID signaling in EHC", 3GPP TSG RAN WG2 Meeting# 107, R2-1909902, Aug. 26-30, 2019, 3 pages.

Sony, "EHC absence of Q-Tags and NACK feedback", 3GPP TSG RAN WG2 Meeting# 109 electronic, R2-2000834, Feb. 24-Mar. 6, 2020, 2 pages.

3GPP, "NR; NR and NG-RAN Overall Description; Stage 2 (Release 15)", 3GPP TS 38.300 V15.2.0, Jun. 2018, pp. 1-87.

Vivo, "Email discussion summary on EHC", 3GPP TSG-RAN WG2 Meeting #107bis, R2-1912312, Oct. 14-18, 2019, pp. 1-38.

3GPP, "NR; Packet Data Convergence Protocol (PDCP) specification (Release 16)", 3GPP TS 38.323 V16.0.0, Mar. 2020, pp. 1-37.

3GPP, "NR; Radio Resource Control (RRC) protocol specification (Release 15)", 3GPP TS 38.331 V15.3.0, Sep. 2018, pp. 1-445.

3GPP, "NR; Radio Resource Control (RRC) protocol specification (Release 16)", 3GPP TS 38.331 V16.0.0, Mar. 2020, pp. 1-835.

Holma et al., "LTE for UMTS OFDMA and SC-FDMA Based Radio Access", John Wiley & Sons, 2009, pp. 25-27.

LG Electronics Inc., "Discussion on Ethernet header compression", 3GPP TSG-RAN WG2 #106, R2-1907554, Reno, USA, May 13-17, 2019, XP051730990, pp. 1-3.

Qualcomm Incorporated, "Principles for Ethernet Header Compression", 3GPP TSG-RAN WG2 Meeting #107, R2-1910764, Prague, Czech Republic, Aug. 26-30, 2019, XP051768532, pp. 1-7.

Ericsson, R2-2003310 "RIL list TS 38.331 Rel-16 ASN.1 review file, phase 1" 3GPP tsg_ran\wg2_rl2,tsgr2_109bise, May 1, 2020.

* cited by examiner

WIRELESS DATA LINK LAYER COMPRESSION AND DECOMPRESSION

CROSS-REFERENCE TO RELATED APPLICATIONS

The present application is based on PCT filing PCT/EP2021/056517, filed Mar. 15, 2021, which claims priority to EP 20175569.1, filed May 19, 2020, the entire contents of each are incorporated herein by reference.

BACKGROUND

Field

The present disclosure relates to communications devices, infrastructure equipment and methods for the compression and decompression of data in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

An example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The need to provide low latency, high reliability data transmission making efficient use of wireless communications resources gives rise to new challenges for efficiently handling communications in wireless telecommunications systems that need to be addressed.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
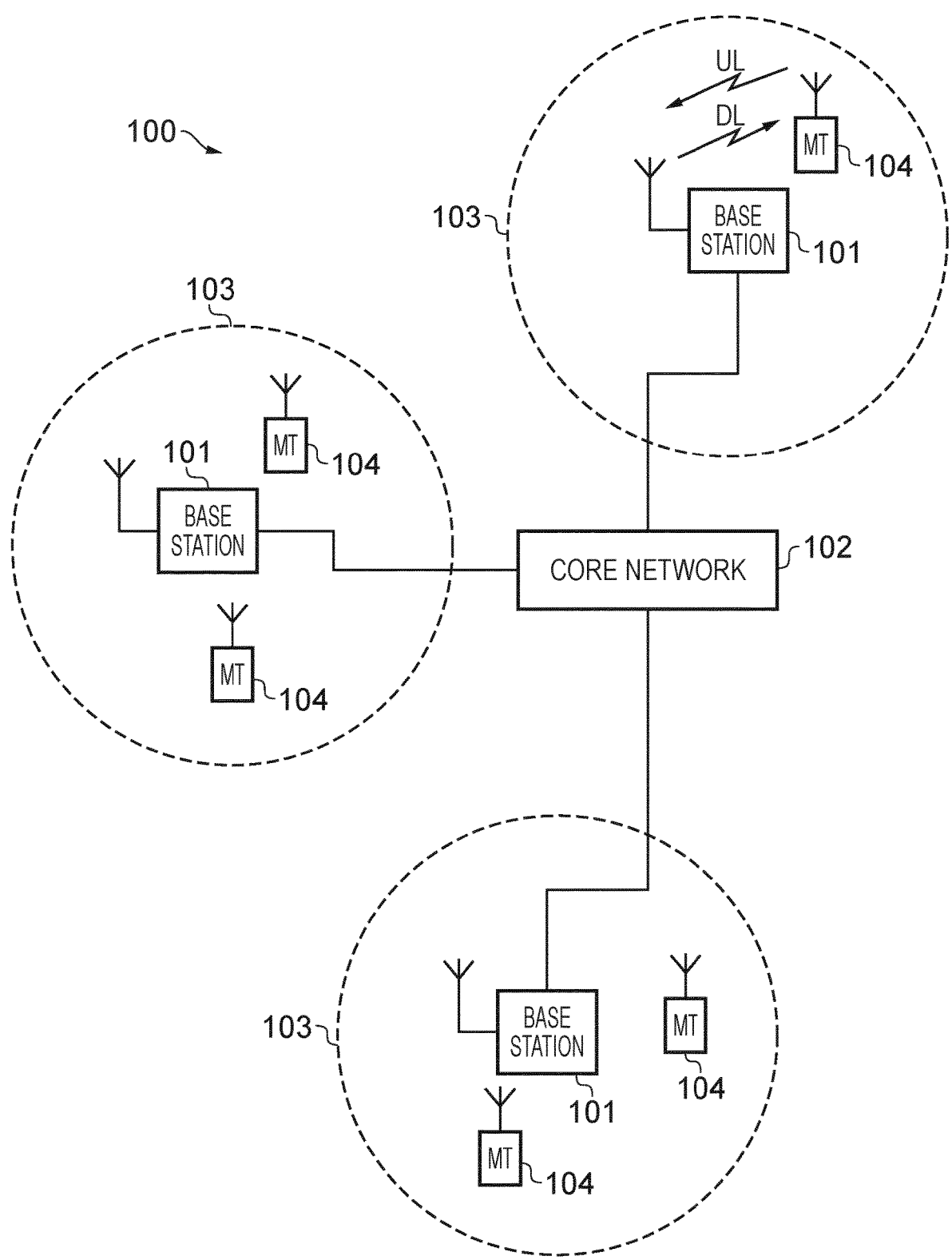
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
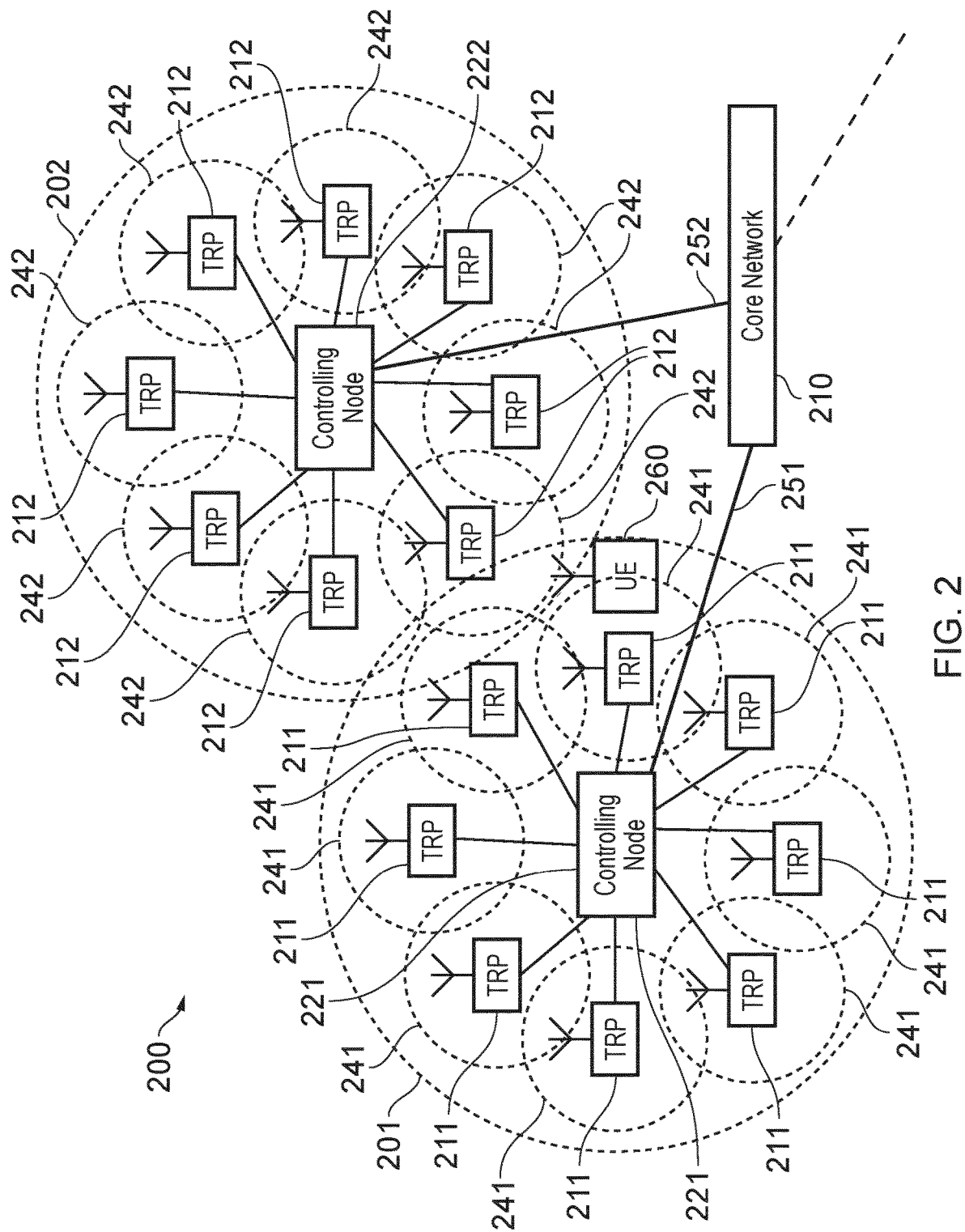
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/ access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
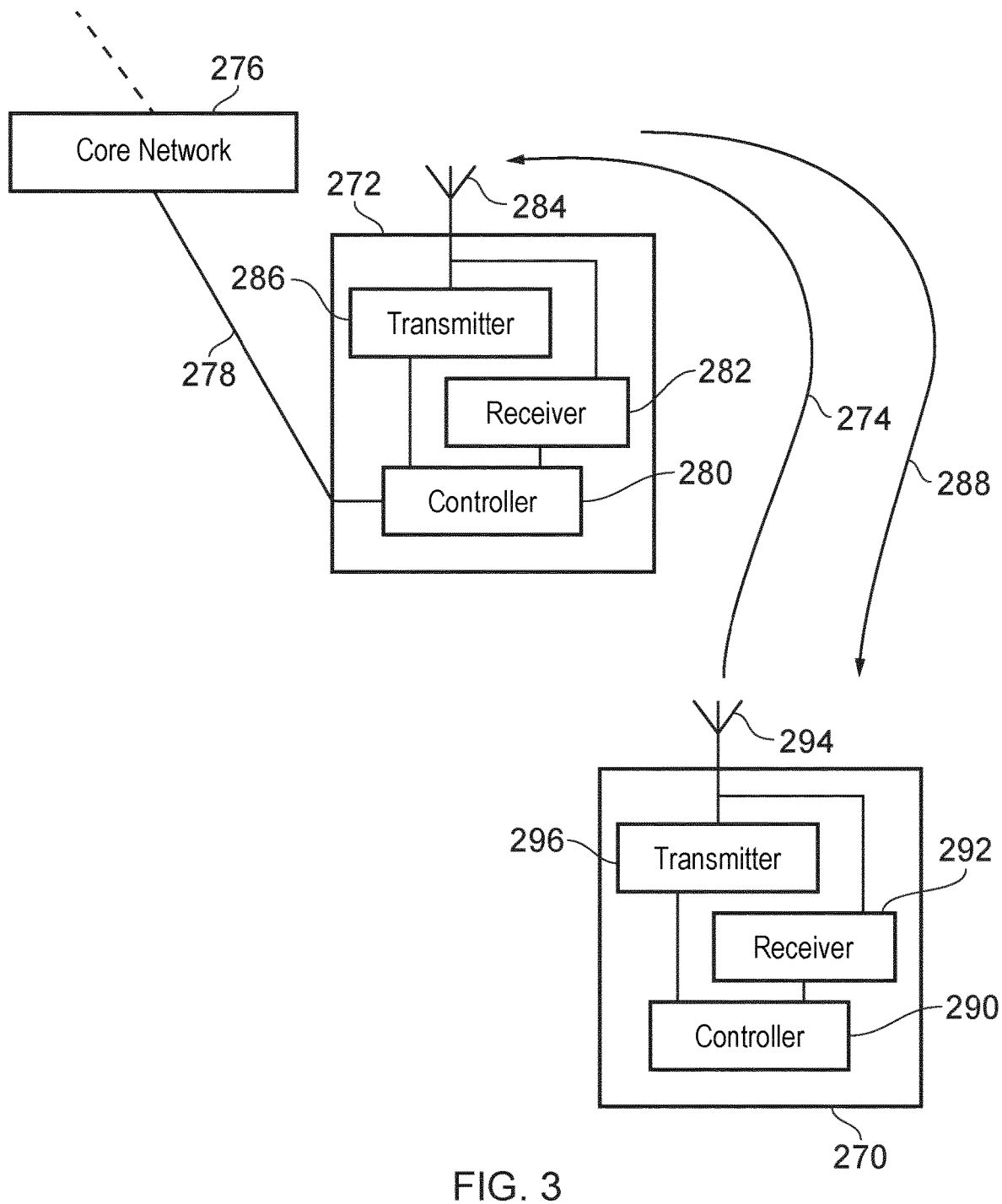
FIG. 3 is a schematic block diagram of an example infrastructure equipment and communications device configured in accordance with example embodiments.

A more detailed illustration of a communications device 270 and an example network infrastructure equipment 272, which may be thought of as a gNB 101 or a combination of a controlling node 221 and TRP 211, is presented in FIG. 3. As shown in FIG. 3, the communications device 270 is shown to transmit uplink data to the infrastructure equipment 272 via grant free resources of a wireless access interface as illustrated generally by an arrow 274. The UE 270 is shown to receive downlink data transmitted by the infrastructure equipment 272 via resources of the wireless access interface as illustrated generally by an arrow 288. As with FIGS. 1 and 2, the infrastructure equipment 272 is connected to a core network 276 (which may correspond to the core network 102 of FIG. 1 or the core network 210 of FIG. 2) via an interface 278 to a controller 280 of the infrastructure equipment 272. The infrastructure equipment 272 may additionally be connected to other similar infrastructure equipment by means of an inter-radio access network node interface, not shown on FIG. 3.

The infrastructure equipment 272 includes a receiver 282 connected to an antenna 284 and a transmitter 286 connected to the antenna 284. Correspondingly, the communications device 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the communications device 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

Conventionally, a wireless telecommunications network interfaces with external networks at the internet protocol (IP) layer. That is, a gateway of the wireless communications network receives IP packets in which the intended recipient communications device is identified by one or more destination address fields (such as IP destination address and/or port number). Similarly, outbound data is formed into IP packets, in which the source communications device is identified by a source IP address and/or source port number. (Note that this may be the case even if techniques such as network address translation are used, whereby the gateway or other entity modifies these addresses so that the address fields on inbound and/or outbound packets are modified at the logical boundary of the wireless communications network).

It will be appreciated that lower layer protocols may be used both within the wireless communications network, and externally to it, such as on links terminating at the gateway. However, headers associated with these protocols may conventionally be discarded before the encapsulated IP packet is forwarded.

Conventionally, wireless communications network have compressed the internet protocol (IP) header when the IP packet is transmitted over a wireless access interface by exploiting redundancy between the headers of sequential IP packets. In order to ensure that the IP header compressor at the transmitter and IP header decompressor at the receiver remain synchronized, the full header is transmitted, uncompressed, at regular intervals. Thus, it is possible for the receiver to reconstruct the original (uncompressed) IP header before forwarding the IP packet or passing it to higher layers in the protocol stack. Header compression can be lossless and may result in significantly improved efficiency in the use of communications resources on the wireless access interface.

Recently, there has been some interest in permitting interfacing of a wireless telecommunications network at a lower protocol layer. In particular, a gateway of the wireless telecommunications network may receive data frames formatted according to the Institute of Electrical and Electronic Engineers (IEEE) 802.3 frame format, or according to the Ethernet frame format, and may convey such frames internally within the wireless communications network, such that the complete Ethernet frame received at the gateway is made available to the end recipient. Similarly, a communications device may be able to construct a frame in accordance with such specifications for transmission outside of the wireless communications network. Ethernet and IEEE 802.3 may be examples of a medium access control (MAC) frame format for data transmission within a local area network (LAN).

It will be appreciated that the frame formats for IEEE 802.3 and for Ethernet are very similar, to the extent that their differences may be immaterial to the presently disclosed techniques, and thus the terms are used interchangeably within the present disclosure. Techniques for header compression at one layer may be combined with header compression at another layer. For example, Ethernet frames contained within internet protocol (IP) packets may be subject to header compression of both the Ethernet frame header and the IP header. IP headers may be compressed in accordance with a conventional robust header compression (ROHC) technique.

Figure 4:
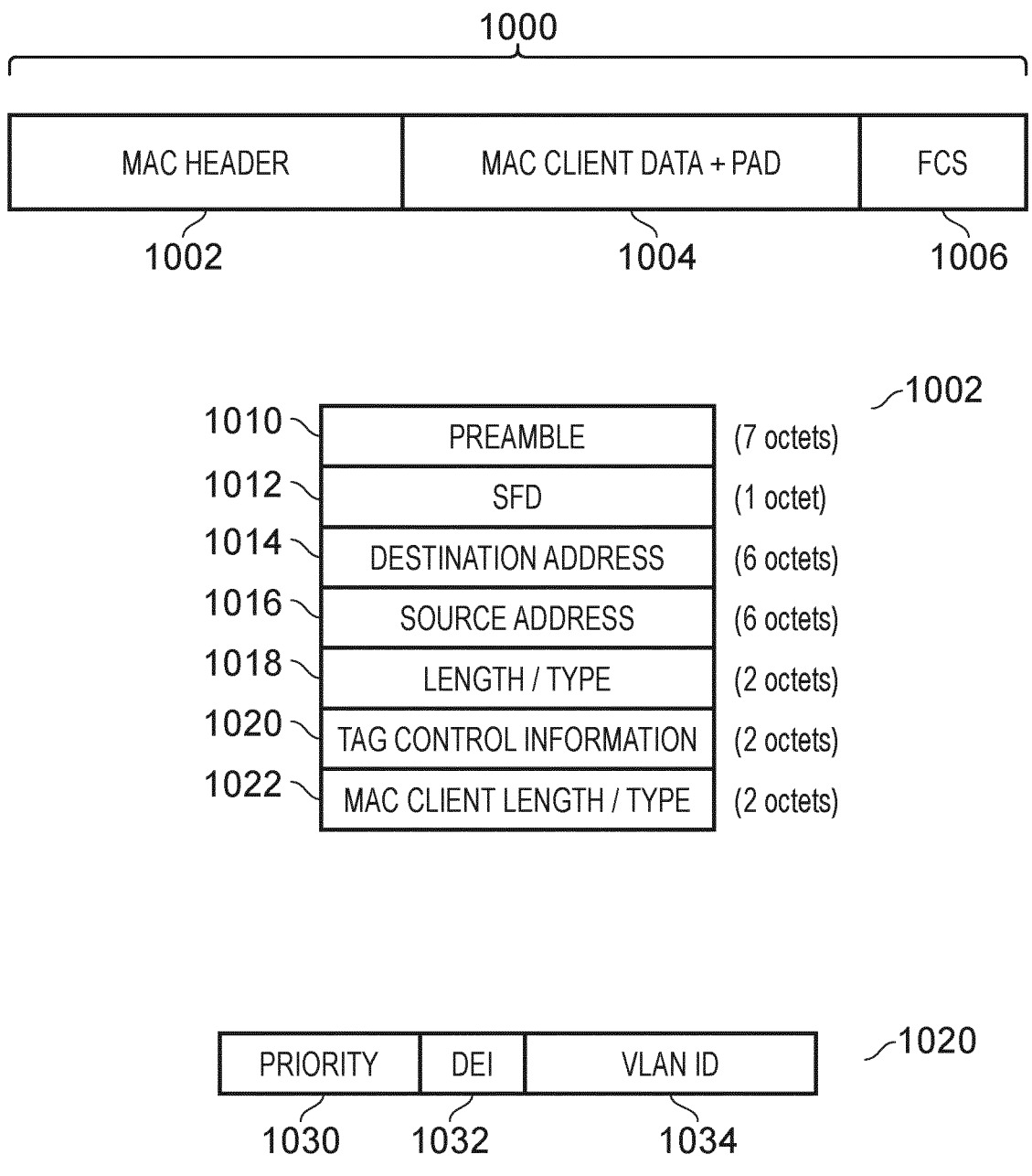
FIG. 4 illustrates an IEEE 802.3 medium access control (MAC) frame format, in accordance with the IEEE 802.1Q (2014) specification.

FIG. 4 illustrates an IEEE 802.3 MAC frame format, in accordance with the IEEE 802.1Q (2014) specification.

The IEEE 802.3 MAC frame 1000 comprises a MAC header 1002, MAC Client data and padding 1004, and a frame check sequence (FCS) 1006. The MAC header 1002 comprises a preamble 1010 and a start frame delimiter (SFD) 1012 of length 7 octets and 1 octet respectively. There then follows a destination address field 1014, and a source address field 1016, each of 6 octets.

The MAC header 1002 also comprises a Length/Type field 1018 and a Tag Control information field 1020, each of two octets. Collectively, the Length/Type field 1018 and Tag Control information field 1020 may be referred to as a Q Tag Prefix.

The MAC header 1002 also comprises a MAC client length/type field 1022 of two octets, which may comprise a pre-determined value to indicate that the Tag Control information field 1020 is present.

The Tag Control information field 1020 may comprise a priority indication field 1030 of 3 bits, a drop eligible indicator (DEI) bit 1032, and a virtual local area network (VLAN) identifier field 1034 of 12 bits.

In some embodiments, for example where the IEEE 802.1Q (2014) specification is not applicable, the MAC header 1002 may not contain the Tag Control information field 1020.

Figure 5:
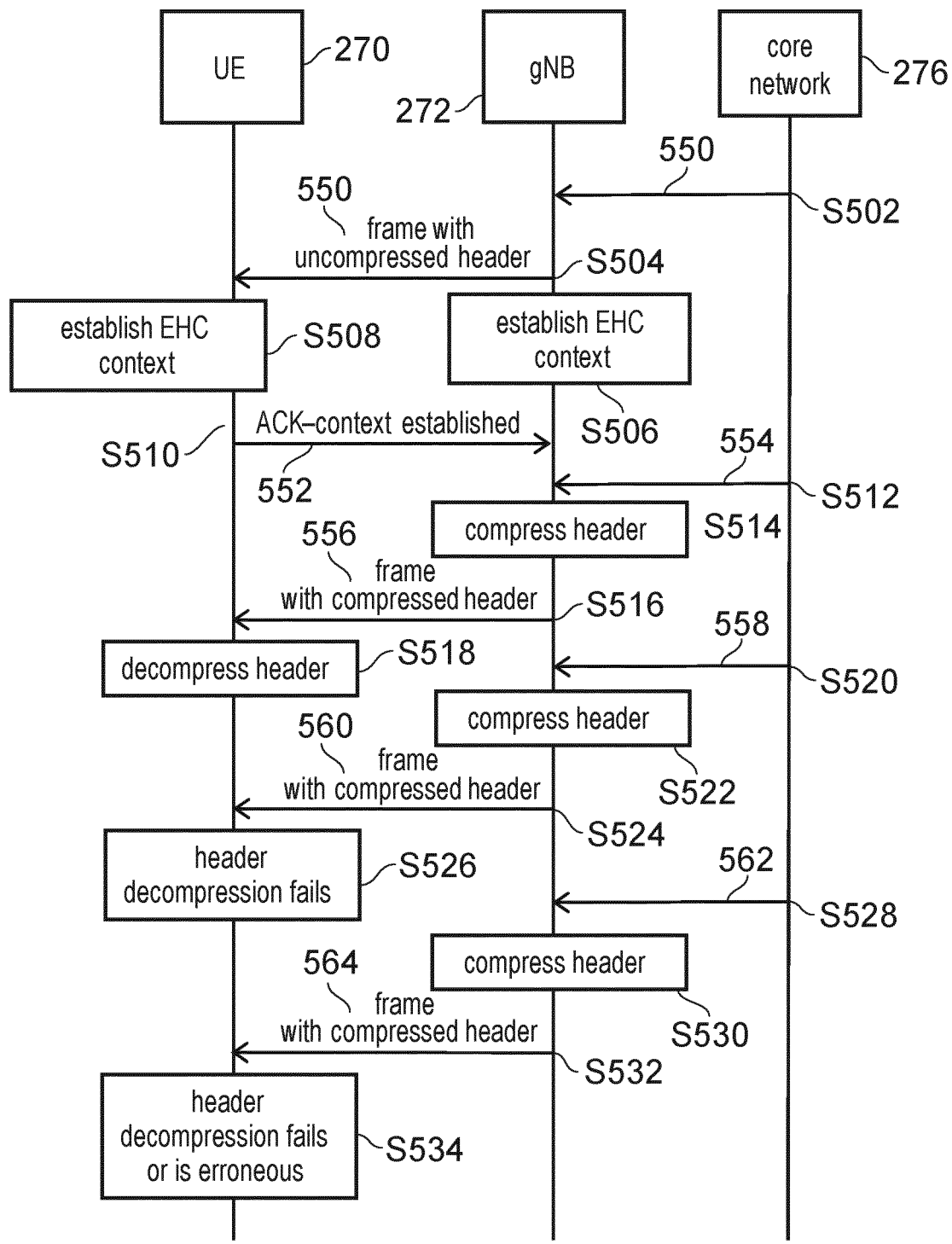
FIG. 5 is a combined message sequence chart and process flow diagram illustrating the use of Ethernet Header Compression (EHC) in accordance with existing proposals.

FIG. 5 is a combined message sequence chart and process flow diagram illustrating the use of EHC in accordance with existing proposals.

The example of FIG. 5 relates to downlink frames (i.e. frames transmitted from the infrastructure equipment 272 to the communications device 270), however it will be appreciated that the present disclosure is not limited to such direction and may be applied in respect of uplink or peer-to-peer (e.g. device-to-device) transmissions.

At the start of the process shown in FIG. 5, the infrastructure equipment 272 and communications device 270 may have completed a connection establishment process, which may be broadly in accordance with conventional techniques, such as by means of radio resource control (RRC) reconfiguration.

As part of the connection establishment process or otherwise, the communications device 270 may be configured (e.g. by means of RRC configuration) such that EHC can be applied in respect of a sequence of downlink frames. The sequence of downlink frames may be defined by one or more of a common destination address, an associated bearer (such as a data bearer or dedicated radio bearer, DRB), and an associated protocol data unit (PDU) session. For example, the sequence may be characterised by a DRB in combination with a destination address. The sequence of downlink frames may be associated with an Ethernet type PDU session.

At step S502, a first downlink frame 550 for transmission to the communications device 270 is transmitted by the core network 276 and received at the infrastructure equipment 272. The first downlink frame 550 comprises an Ethernet header. It will be appreciated that the first downlink frame 550 (and other downlink frames referred to herein) may further comprise headers in accordance with packet or frame formats associated with respective protocols used in the transmission of the frame. For example, the first downlink frame 550, when transmitted from the core network 276 to the infrastructure equipment 272 may be encapsulated within one or more general packet radio service (GPRS) tunnelling protocol (GTP) packets, each including a GTP header.

Further, the frames referred to herein may be segmented and reassembled and/or retransmitted, and otherwise processed in accordance with protocols and techniques associated with the respective interfaces over which they are transmitted. These protocols may include medium access control (MAC), radio link control (RLC) and protocol data convergence protocol (PDCP) protocols. The details of these are omitted from the present description.

Because EHC relies on a compression context, which is based on previously transmitted frames, it is not possible to compress the Ethernet header of the first downlink frame 550 using EHC. Accordingly, at step S504, the first downlink frame 550 is transmitted via the wireless access interface 288 to the communications device 270.

It will be appreciated that additional steps (encoding, modulation, forward error correction, and so on) may be carried out as part of the transmission of downlink frames, such as the first downlink frame 550, via the wireless access interface. For example, in some embodiments, a packet data convergence protocol (PDCP) protocol data unit (PDU) may be formed comprising a respective downlink frame. Ciphering and/or an integrity protection function may be applied to the respective downlink frame.

The details of these steps, which may be in accordance with any appropriate techniques, are omitted for conciseness. In some embodiments of the present technique, transmissions via the wireless access interface may be in accordance with known techniques for the transmission of URLLC data via a 5G (NR) wireless access interface.

At step S506, the infrastructure equipment 272 establishes an EHC context for the compression of subsequent frames comprising an Ethernet header destined for the communications device 270. The EHC context may be associated with a context ID. The context may be established based on one or more of the header fields of the first downlink frame 550.

At step S508, the communications device 270 establishes a corresponding EHC context for the decompression of subsequent frames comprising an Ethernet header destined for the communications device 270 and transmitted by the infrastructure equipment 272. The context may be associated with the context ID. The context may be established based on one or more of the header fields of the first downlink frame 550. The first downlink frame 550 may be transmitted together with, or modified to include, an indication of the context ID. Accordingly, the communications device 270 may determine the context ID based on the received first downlink frame 550.

The received first downlink frame 550 may be transferred to, or towards its destination (not shown in FIG. 5). Its destination may be another logical process running on the communications device 270, or may be another entity, to which the communications device 270 is connected, directly or indirectly.

At step S510, the communications device 270 transmits an EHC acknowledgement (ACK) 552 to the infrastructure equipment 272. The EHC ACK 552 may indicate to the infrastructure equipment 272 that the communications device 270 has established its EHC context and is prepared to receive subsequent downlink frames in which one or more fields of an Ethernet header have been compressed using EHC.

The EHC ACK 552 may comprise an indication of the context ID.

At step S512, a second downlink frame 554 for transmission to the communications device 270 is transmitted by the core network 276 and received at the infrastructure equipment 272. The second downlink frame 554 comprises an Ethernet header.

Because both the infrastructure equipment 272 and the communications device 270 have established corresponding EHC contexts, then at step S514, the infrastructure equipment 272 applies EHC to the second downlink frame 554, based on the context created at step S506, to create a modified version of the second downlink frame. The modified version of the second downlink frame may comprise an indication of the context ID. As part of step S514, the context may be updated.

At step S516, the modified version of the second downlink frame 556 (in which one or more fields of the Ethernet header are compressed) is transmitted via the wireless access interface to the communications device 270.

At step S518, based on the context established at step S508, the communications device 270 applies decompression to the compressed Ethernet header fields, to reconstruct the original second downlink frame 556. As part of this decompression, the communications device 270 may remove the indication of the context ID. As part of step S518, the communications device 270 may update its context.

Steps S512, S514, S516 and S518 may be repeated in respect of successive downlink frames, whereby each frame is subject to EHC based on the context at the infrastructure equipment 272, transmitted, modified, via the wireless access interface to the communications device 270, and reconstructed by means of decompression of the Ethernet header.

For each downlink frame, the context at both the infrastructure equipment and the communications device may be updated, so that the compression/decompression of a frame depends on the context, which in turn may depend on the contents of the Ethernet headers of previously transmitted frames.

However, it may be that a particular frame is not successfully reconstructed at the communications device 270. This may be for any reason. For example, an error introduced on reception of the frame over the wireless access interface may render the frame, as received at the header decompression process, erroneous. Alternatively, the frame may not be received at all at the header decompression process—this may be because an error detected elsewhere in the protocol stack causes the frame to be discarded. An attempted reconstruction may be unsuccessful because context at the compressor/decompressor has been corrupted.

In the example of FIG. 5, a third downlink frame 558 is received at the infrastructure equipment 272 at step S520 and header compression is applied at step S522 to form a modified frame 560. The modified third downlink frame 560 is transmitted at step S524 to the communications device 270. However, decompression of the compressed Ethernet header within the modified third downlink frame 560 is not successfully completed. In some examples, decompression is not attempted at all. In the example of FIG. 5, the decompression is attempted at step S526, but is unsuccessful. Accordingly, unlike the first and second downlink frames 550 and 554, whose headers are either not compressed or are compressed and successfully decompressed, the third downlink frame 558 cannot reach its intended destination.

It will be further apparent that when the compression context at the compression and decompression processes depends on previously compressed/decompressed headers, a failure to decompress one frame may result in subsequent failures or errors in decompressing subsequent frames.

In the example of FIG. 5, after, or as part of, step S522, the infrastructure equipment 272 updates the EHC context. However, the communications device 270 may either not update its context at all, or may update it erroneously, following, as part of, or in the absence of step S526.

Thus, the compression context at the infrastructure equipment 272 and the decompression context at the communications device 270 are not longer synchronised.

In the example of FIG. 5, this may result in the failure to decompress a fourth downlink data frame 562 received by the infrastructure equipment 272 at step S528. At step S530 the fourth downlink data frame is compressed in accordance with the context which was updated at step S522. The modified (i.e. having a compressed Ethernet header) frame 564 is transmitted to the communications device 270 at step S532.

However, at step S534, the communications device 270 attempts to decompress the modified fourth downlink data frame 564 based on context which was not, or was incorrectly, updated after the transmission of the third modified downlink data frame 560. Accordingly, the decompression may fail or result in an erroneous reconstructed frame.

High reliability data transmission is required for services such as industrial internet of things (IIoT) services, and it is proposed (see [6]) that a 3GPP NR system may support compression of Ethernet frame headers by means of Ethernet Header Compression (EHC) to improve the efficient use of communications resources on wireless access interfaces.

In the event that a decompressor receives a frame with a compressed header associated with an unknown context (i.e. with a context ID, CID, which it does not recognise), it is proposed that the decompressor discard the frame, inform the compressor with a negative acknowledgement, or perform radio link failure procedures [5]. It has been further proposed that when a compressed packet with an unknown CID is received by the decompressor, the compressor should be informed so that the compressor could switch to full header transmission.

In [3], it has been proposed that an EHC solution should allow transmission of a full (uncompressed) header between the transmission of frames with compressed headers.

In [4] it has been proposed that Ethernet header compression feedback is provided in a packet data convergence protocol (PDCP) header and be configurable by the network. Feedback is used to indicate the synchronisation status between compressor and decompressor.

In [6] it has been proposed to define an EHC feedback packet. Proposals for the operation of EHC may be found in Annex A of [6].

Figure 6:
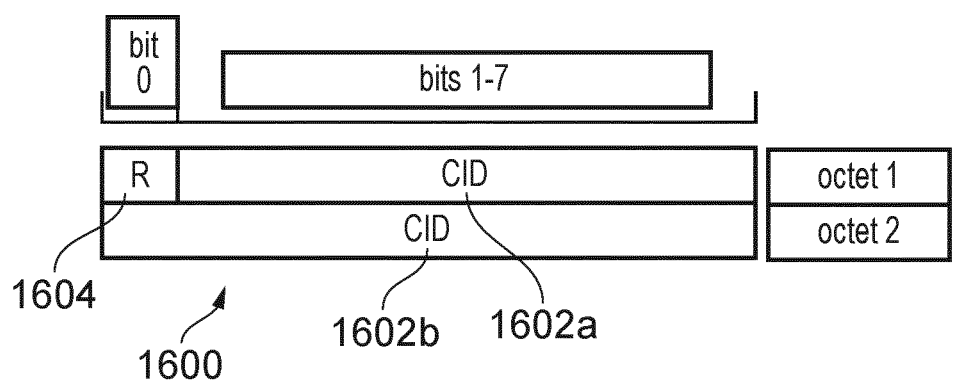
FIG. 6 illustrates a portion of an EHC feedback packet in accordance with current proposals.

FIG. 6 illustrates a portion of an EHC feedback packet 1600 in accordance with current proposals (see [6]). The feedback packet comprises a context ID indication (1602*a*, 1602*b*) and a reserved bit 1604. The context ID indication may comprise 7 bits (in which case octet 2 may be omitted) or 15 bits.

There remains a need to provide improved techniques and apparatus for the reliable transmission of data, while making efficient use of radio resources, in particular for the transmission of Ethernet frames.

Thus, there is provided a processing data frames for transmission on a wireless access interface of a wireless communications system, the method comprising receiving a first data frame comprising a first protocol header, the first protocol header associated with a medium access control (MAC) frame format for data transmission within a local area network (LAN), applying header compression in accordance with a header compression context to the first data frame by compressing one or more protocol header fields of the first protocol header to form a first compressed data frame for transmission on the wireless access interface, receiving a second data frame comprising a second protocol header associated with the MAC frame format, and determining that none of the fields of the second protocol header are to be compressed in accordance with the header compression context before the second data frame is transmitted on the wireless access interface.

Embodiments of the present technique can therefore provide for the reliable transmission of frames after a failure to correctly decompress an earlier-transmitted frame in which compression was applied to the Ethernet header prior to transmission. Certain embodiments of the present technique can avoid a need for explicit per-frame feedback from a decompressor.

In some embodiments, a compressor establishes an EHC context for compressing some or all fields within the Ethernet headers of frames associated with a data flow, and performs EHC in accordance with the context for one or more such frames. The compressor subsequently determines that EHC is not to be applied in accordance with the existing context to one or more subsequent frames associated with the data flow, and accordingly transmits the one or more subsequent frames without such EHC having been applied.

In some embodiments, the compressor additionally or alternatively determines to establish new compression context, and applies header compression in accordance with the new context to one or more of the subsequent frames, which would otherwise have been associated with the previously established context.

Frames may be associated with each other (and hence, conventionally, with a single context) based on one or more of their destination, an associated data bearer and an associated protocol data unit (PDU) session. Unless explicitly stated otherwise, sequences of frames in a given direction described herein are associated with each other.

In some embodiments, the compressor additionally retransmits one or more frames to which EHC was previously applied.

The retransmitted frames may be subject to EHC compression. In some embodiments, the retransmitted frames are compressed in accordance with the previous context. In some embodiments, the retransmitted frames are compressed in accordance with the newly-established context. Where this results in the a same frame being transmitted and successfully received (after any decompression) more than once, deduplication may be carried out. The deduplication may be carried out by higher layer protocol entities.

In some embodiments, the determination that EHC is not to be applied to the one or more subsequent frames is based on feedback received from the corresponding peer decompressor entity.

In some embodiments, the feedback from the decompressor is explicit and may comprise a negative acknowledgement (NACK) indication, indicating that one or more frames of the data flow could not be correctly decompressed, and/or that a context identifier associated with a compressed packet did not correspond to a valid compression context. In accordance with some embodiments of the present technique, explicit NACK feedback is included in an EHC feedback packet. For example, in some embodiments, the reserved bit 1604 of the EHC feedback packet 1600 is used to indicate the NACK. When the reserved bit 1604 is set to a first value (e.g. '0'), no NACK feedback is indicated. When the reserved bit 1604 is set to a second value (e.g. '1'), NACK feedback is indicated.

In some embodiments, for example, where a context identifier associated with a compressed packet did not correspond to a valid compression context, the NACK feedback may not be associated with a particular context ID.

In some embodiments, in response to receiving such NACK feedback which is not associated with a particular context ID, the entity performing the compressor function (e.g. the infrastructure equipment 272) may consider the NACK feedback to apply to each EHC context used for compressing frames which are destined to the entity performing the decompressor function (e.g. the communications device 270). Accordingly, for example, where multiple EHC contexts are used in parallel in respect of different data frame sequences which are destined (or transmitted to) the same receiving entity (e.g. communications device or infrastructure equipment), in response to receiving such NACK feedback, one or more data frames of each sequence may be transmitted without the application of the corresponding EHC context. The frames may be transmitted uncompressed and/or may be used to establish a new respective EHC context for the respective frame sequence.

In some embodiments, only positive feedback is transmitted by the decompressor, the positive feedback indicating that the decompressor has correctly decompressed the headers of one or more frames. In some such embodiments, the determination by the compressor not to apply EHC is in response to determining that expected positive feedback has not been received from the decompressor.

In some such embodiments, the feedback identifies only a context identifier, and does not identify a particular packet. In some embodiments, positive feedback is sent not only during the initial context setup phase, is sent in response the successful decompression of each header, while it is successful in decompressing received frames.

In some embodiments in which the decompressor generates a feedback packet for every EHC packet received and successfully decompressed, the compressor may implement a sliding window mechanism whereby if EHC was applied to a first number of packets and the first number of packets were transmitted within a transmission window, the determination by the compressor not to apply EHC is in response to determining that fewer than a second number (not higher than the first number) of EHC feedback packets is received during a corresponding receive window. The difference between the first number and the second number may be zero.

Additional steps taken by the compressor (e.g. establishing a new context) may be dependent on the EHC feedback received during the receive window.

The second number (or the difference between the first number and the second number) may be configured by the network or otherwise preconfigured for the compressor.

In some embodiments, the decompressor generates positive feedback (e.g. by transmitting a feedback packet) which does not indicate the number of frames which have been successfully decompressed.

Nevertheless, in some embodiments, the determination by the compressor not to apply EHC is based on the amount of such feedback received.

In some embodiments, a timer is defined which is started at the transmission or compression of a particular data frame. The determination by the compressor not to apply EHC using an existing context is in response to determining that no positive feedback has been received from the peer decompressor before the timer expires.

In some embodiments, the determination not to apply EHC is determined autonomously, irrespective of any explicit feedback received from the peer decompressor, and/or where no explicit feedback is received from the peer decompressor.

In some embodiments, a new context may be created after a number of frames compressed in accordance with an existing context exceeds a threshold. The threshold may be pre-configured, or dynamically determined. For example, in some embodiments, after 100 frames have been compressed in accordance with a context, then a new context is established and subsequent frames which would otherwise have been processed in accordance with the original context (e.g. because they are associated with a particular data flow) are processed in accordance with the new context. This process may be repeated.

In some embodiments, the condition(s) for the determination by the compressor not to apply EHC using an existing context are specified in an appropriate standards specification. In some embodiments, additionally or alternatively, one or more conditions may be pre-configured at the compressor, or indicated using control signalling from a control entity.

In some embodiments, the conditions are associated with one or more parameters. The one or more parameters may be specified in an appropriate standards specification, pre-configured at the compressor, and/or indicated using control signalling from a control entity.

In some embodiments, an entity which performs the function of a compressor may also perform the function of a decompressor. That is, for example, the infrastructure equipment 272 may perform compression using EHC in respect of frames to be transmitted on a downlink of a wireless access interface to a communications device, and may also perform decompression using EHC in respect of frames transmitted on an uplink of a wireless access interface by a communications device. Similarly, for example, the communications device 270 may perform compression using EHC in respect of frames to be transmitted on the uplink of the wireless access interface to the infrastructure equipment, and may also perform decompression using EHC in respect of frames transmitted on the downlink of the wireless access interface by the infrastructure equipment. Where a same entity performs the function of a compressor and decompressor, these may operate in a corresponding manner, or may operate using different techniques. For example, an entity providing a decompressor function may provide positive feedback in respect of each successfully decompressed header, while a compressor function provided by the same entity may operate without regards to any positive feedback or may operate according to different procedures or options, without regards to any positive feedback.

For example, such an entity may provide positive feedback in response to each frame where decompression is successful, and may determine not to apply EHC compression using an existing context based on an expectation that the peer entity also provides positive feedback in response to each frame where decompression is successful.

Alternatively, for example, an entity may provide positive feedback in response to each frame where decompression is successful, but may determine not to apply EHC compression using an existing context irrespective of (and thus not requiring or expecting) any feedback generated by the peer entity.

Figure 7:
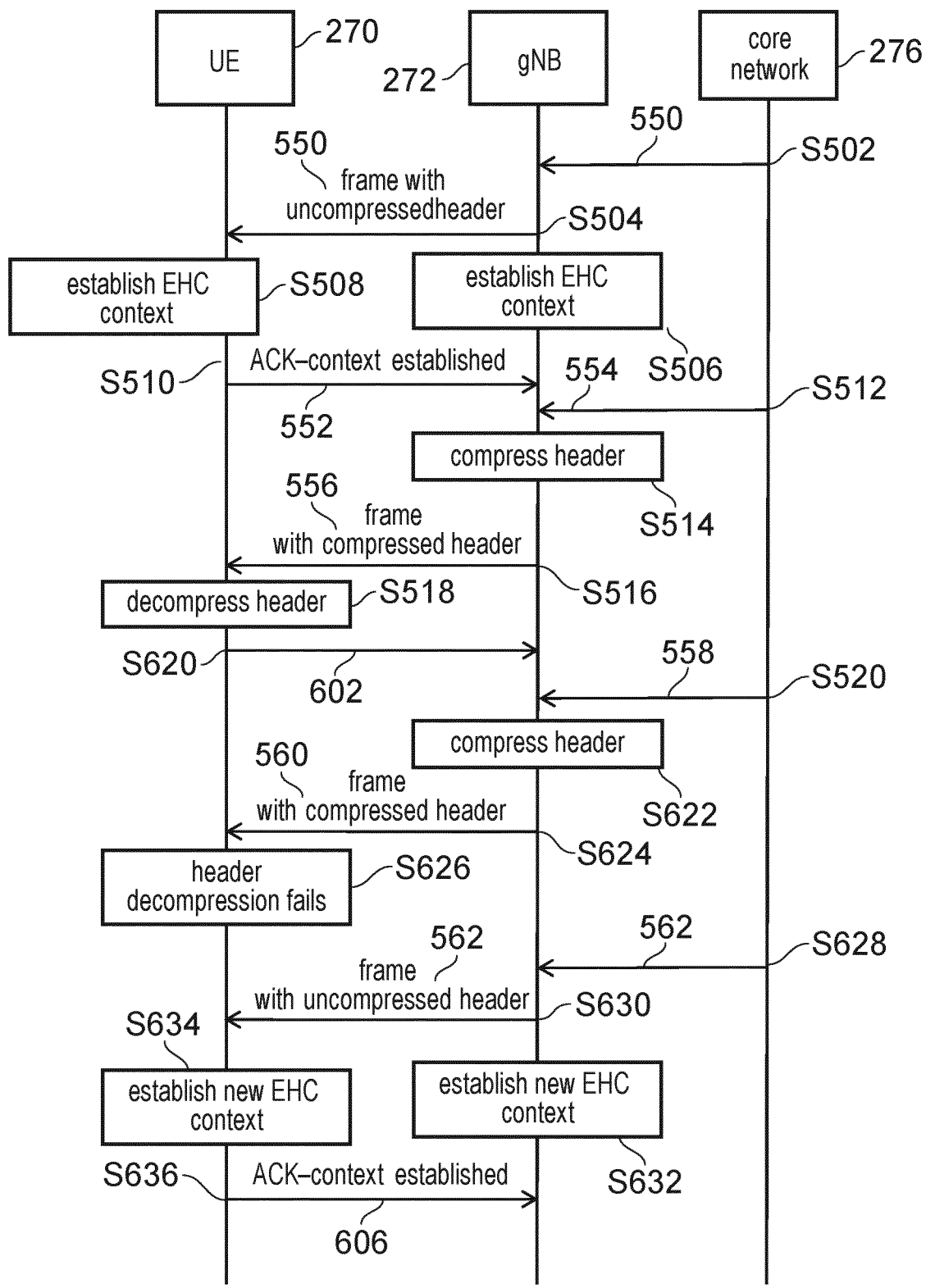
FIG. 7 is a combined message sequence chart and process flow diagram illustrating the use of EHC in accordance with embodiments of the present technique.

FIG. 7 is a combined message sequence chart and process flow diagram illustrating the use of EHC in accordance with embodiments of the present technique.

Many of the features and steps of the example of FIG. 7 correspond to like-numbered features and steps of FIG. 5, and a description of these will be omitted for conciseness.

In particular, in the example of FIG. 7, steps S502-S520 may occur as in the example of FIG. 5 and as described above.

In the example of FIG. 7, the decompressor entity (within the communications device 270) provides positive feedback in respect of each frame where header decompression is successful. Accordingly, in addition to the positive feedback 552 transmitted at step S510, the decompressor generates positive feedback (ACK) 602 which is transmitted at step S620. The ACK 602 is transmitted in response to the successful decompression of the header of the modified version of the second downlink frame 556 at step S518.

Steps S520, S622, S624 and S626 may then proceed, corresponding to steps S520, S522, S524 and S526 of the example of FIG. 5 as described above.

In some embodiments, step S622 occurs in response to the receipt of the ACK 602.

In response to the failure of the decompression at step S626 (or as a result of the absence of any attempted decompression), no ACK is generated by the compressor entity of the communications device 270 to indicate the successful decompression of the modified third downlink frame 560.

At step S628, the infrastructure equipment 272 receives the fourth downlink data frame 562 from the core network 276.

In response to receiving the fourth downlink data frame 562 and in response to determining that no positive feedback has been received from the compressor indicating the successful decompression of the modified third downlink frame 560, the compressor determines that the EHC, using the existing context, is not to be applied to the fourth downlink data frame 562. Accordingly, at step S630, the fourth downlink data frame 562 is transmitted, without EHC having been applied.

At step S632 and S634, the compressor and decompressor establish a new EHC context for the data flow. The new context may be based on the fourth downlink data frame 562. A context ID for the new EHC context may be transmitted together with the fourth downlink data frame 562.

At step S636, the decompressor generates a positive acknowledgement (ACK) 606 to indicate that the new context is established. The ACK 606 is transmitted to the compressor.

Subsequently, the compressor continues to apply EHC compression based on the new context, as long as positive acknowledgements are received which indicate that the decompressor successfully decompresses each compressed header.

Figure 8:
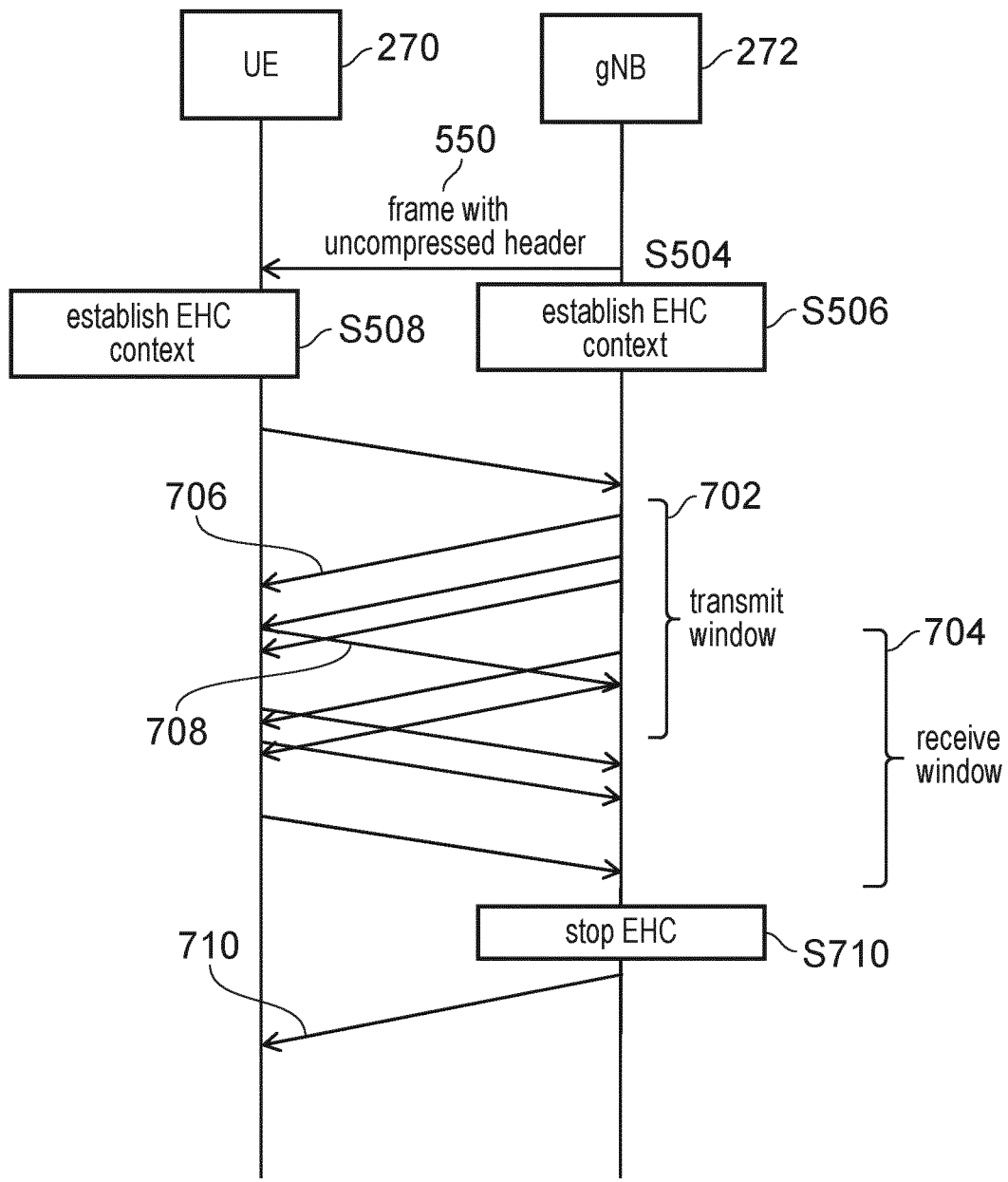
FIG. 8 is a combined message sequence chart and process flow diagram illustrating the use of EHC in accordance with embodiments of the present technique.

FIG. 8 is a combined message sequence chart and process flow diagram illustrating the use of EHC in accordance with embodiments of the present technique.

In the example of FIG. 8, the compressor generates a separate positive feedback indication for each successfully decompressed header, or otherwise generates feedback that indicates how many headers have been successfully decompressed. However, in some embodiments, the feedback does not indicate which header(s) (and accordingly, frames) the feedback relates to.

As illustrated in FIG. 8, in some embodiments, the compressor maintains a sliding transmit window and a sliding receive window. The sliding receive window may be offset in time (e.g. delayed) with respect to the transmit window. The duration of the receive window may exceed the duration of the transmit window.

If the number of headers compressed and/or transmitted within the transmit window exceeds, by a predetermined number, the number of headers which are indicated by feedback as having been successfully decompressed, then the compressor determines to cease (at least temporarily) using EHC in accordance with the current context for frames to be transmitted.

In some embodiments, the feedback indication indicates a data flow and/or context ID.

Steps S502, S504 and S506 may occur as in the example of FIG. 5 and as described above.

In the example of FIG. 8, a transmit window 702 and a corresponding receive window 704 are shown. The transmit window 702 and the receive window 704 are 'corresponding' in the sense that it is the number of headers to which EHC compression is applied in the transmit window 702 which is compared to the number of headers indicated as correctly decompressed indicated by acknowledgements received during the receive window 704.

In the example of FIG. 8, each acknowledgement 708 generated by the decompressor at the communications device 270 indicates that one header has been correctly decompressed. The acknowledgements 708 may indicate a context ID used for decompression. Each acknowledgement 708 may not identify which frame(s) was/were successfully decompressed, triggering the respective acknowledgement.

As shown in FIG. 8, within the receive window 704, four acknowledgements 708 were received, indicating that four headers were successfully decompressed.

During the corresponding transmit window 702, five headers were compressed by the compressor at the infrastructure equipment 272.

Accordingly, the compressor determines that the number of headers compressed during the transmit window 702 exceeds, by one, the number of headers indicated within the receive window 704 as successfully decompressed.

In the example of FIG. 8, a threshold for such a difference, at which header compression using the current context is not used, is zero, i.e. any difference between the number of headers compressed during the transmit window 702 and the number of headers indicated within the receive window 704 as successfully decompressed results in cessation of header compression.

In some embodiments, the threshold is zero. In other embodiments the threshold is a different value.

At step S710, the compressor determines that EHC compression using the current context is to stop. In the example of FIG. 8, at least one subsequent frame 710 is transmitted without any EHC compression applied.

In some embodiments, a new context is established after step S710.

In some embodiments, the existing context is re-established, based on the transmission of one or more frames to which EHC header compression is not applied.

In some embodiments, one or more of the frames transmitted during the transmit window 702 are retransmitted.

Figure 9:
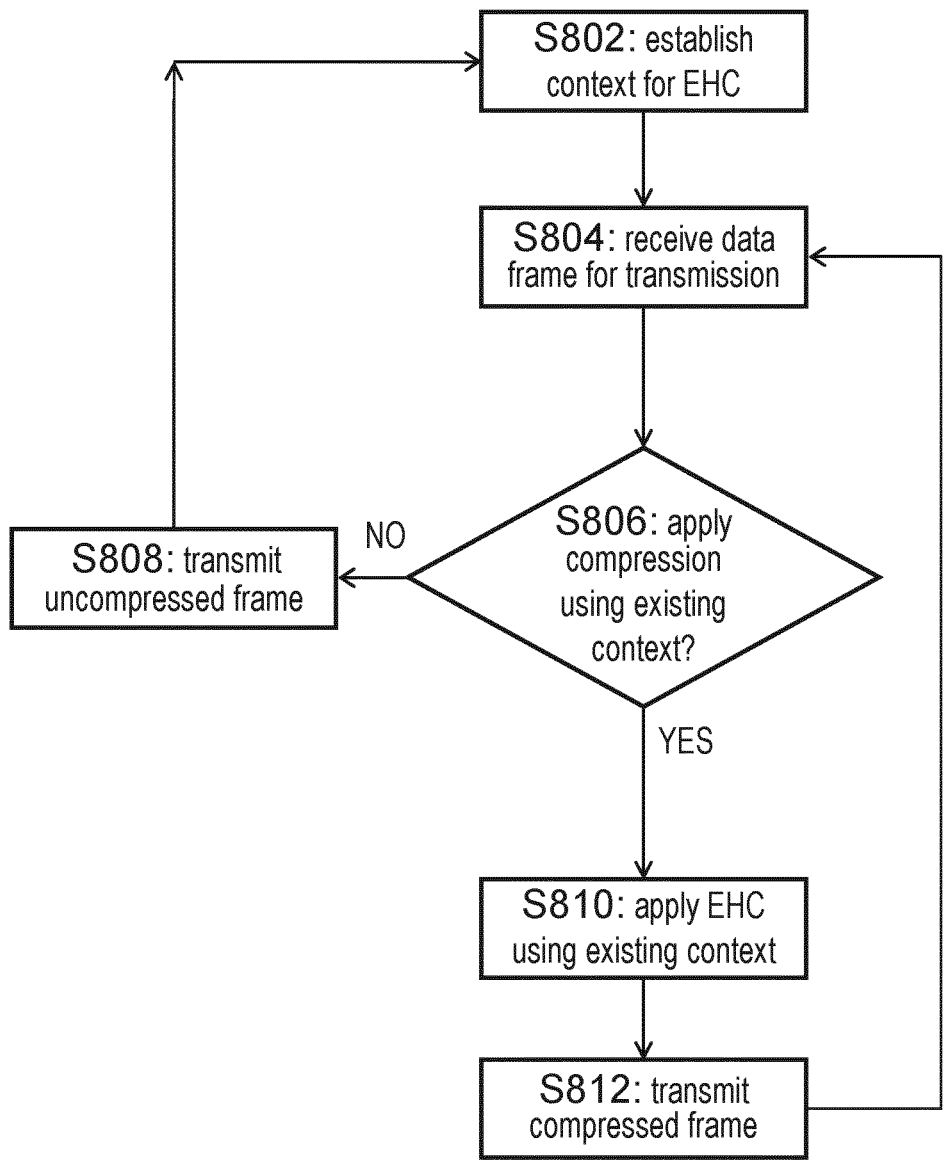
FIG. 9 is a flow chart for a process, which may be carried out by a compressor in accordance with embodiments of the present technique.

FIG. 9 is a flow chart for a process which may be carried out by a compressor in accordance with embodiments of the present technique. The compressor function may be implemented by an infrastructure equipment (for data transmitted on a downlink of a wireless access interface) or by a communications device (for data transmitted on an uplink of a wireless access interface, or via peer-to-peer communications). However, the disclosure is not so limited and the process of FIG. 9 may be carried out by any suitable entity.

The process of FIG. 9 may be implemented by a processor or controller in accordance with a program stored on a computer-readable medium. The processor or controller may operate in conjunction with transmitter and receiver circuitry for transmitting and receiving signals on a wireless access interface, for example, as part of an infrastructure equipment or communications device.

The process of FIG. 9 starts at step S802 in which a context is established for the compression of subsequent Ethernet frame headers. The context may be established by transmitting one or more frames in which the headers are uncompressed to the peer decompressor.

The peer decompressor may indicate that it has established a corresponding EHC context, by means of an EHC acknowledgement.

At step S804, the compressor receives data comprising an Ethernet frame for transmission on a wireless access interface. The data may be received from another entity (e.g. a core network entity) and/or from another logical entity (e.g. a higher protocol layer).

The data may be associated with the context established at step S802 based on a destination of the data, a data bearer associated with the bearer, or by any other suitable means.

At step S806, the compressor determines whether EHC compression using the context established at step S802 is to be used for the data at step S804.

This determination may be made in accordance with one or more of the principles described herein. For example, the determination may be made based on a number of compressed frames, whose header was compressed in accordance with the context, transmitted within a transmit window and a number of successful decompressions indicated by positive acknowledgements received from the peer decompressor within an associated receive window.

In addition, or alternatively, the determination may be made based on a number of frames which have been compressed using the context since the last frame was transmitted without EHC compression. In such embodiments, if the number of frames which have been compressed using the context since the last frame was transmitted without EHC compression exceeds a predetermined threshold, then it is determined that EHC compression using the context established at step S802 is not to be used for the data. Embodiments of the present technique can therefore ensure that lack of synchronisation of the compressor and decompressor can be avoided for long sequences of data.

In some embodiments, the determination may be based on a number of frames which have been not been compressed using the context since the last frame was transmitted where EHC compression was applied. In some such embodiments, if the number of frames which have not been compressed using the context since the last frame was transmitted using EHC compression does not exceed a predetermined number, then it is determined that EHC compression using the context established at step S802 is not to be used for the data.

Embodiments of the present technique can therefore ensure that where a break in the use of compression is provided, it is sufficient to ensure with high probability that the compressor and decompressor are synchronised before compression is used again.

If it is determined that EHC compression using the context established at step S802 is to be used for the data received at step S804 ('YES'), then control passes to step S810.

At step S810, the Ethernet header within the data is compressed in accordance with the context established at step S802. The context may be updated accordingly.

Control then passes to step S812, in which the modified data (i.e. a copy, or modified version of the data in which the header is compressed) is transmitted. The modified data may be transmitted via the wireless access interface or, where the compressor and transmitter are not integrated in a single entity, via any other appropriate interface for transmission via the wireless access interface, Control may then return to step S804.

If it is determined that EHC compression using the context established at step S802 is not to be used for the data received at step S804 (1\10'), then control passes to step S808.

At step S808, the data is transmitted (or forwarded for transmission) without any EHC compression being applied to the Ethernet header.

After step S808, in some embodiments control passes to step S802 and a new context is established. In some embodiments, control passes from step S808 to step S804. In some embodiments, control passes to step S802 or step S804 in accordance with predetermined criteria.

A corresponding process may be implemented at a decompressor, in accordance with embodiments of the present technique.

In some embodiments, the decompressor may establish a new EHC context in response to receiving a frame in which the Ethernet header is not compressed and which is associated with (e.g. is transmitted together with) a context ID.

The EHC context may be updated in response to receiving a compressed Ethernet header associated with the context ID corresponding to the EHC context.

In some embodiments, after determining that EHC is not to be applied in accordance with the existing context to one or more subsequent frames associated with the data flow, and sending the one or more frames without applying the EHC in accordance with the existing context, the compressor applies compression in accordance with the existing context to one or more further subsequent frames. By transmitting frames to which EHC has not been applied, the context at the compressor and decompressor can be resynchronised, such that subsequent frames with compressed headers can be decompressed using the (resynchronised) context.

In some embodiments, the techniques described herein are applied only in respect of data frames being associated with one or more of a quality of service requirement for a probability of successful reception which exceeds a predetermined reliability threshold, and a quality of service requirement for a maximum permitted latency of transmission which is below a predetermined latency threshold. For example, one or more techniques may be applied only if a data frame is determined to be associated with a URLLC service, as specified in a particular release of a 3GPP specification.

In some embodiments of the present technique, the processes described herein may be carried out by an infrastructure equipment or a communications device of a wireless communications network. In some embodiments of the present technique, the processes described herein may be carried out by any suitable apparatus, such as a core network entity.

Above have been given descriptions of example processes combining sequences of steps and messages in combination. The scope of the present disclosure is not, however, limited to such specific combinations and in some embodiments, various of the steps and messages described may be omitted, or combined in a different order, or modified. Features or steps described in the context of one example may be combined with features or steps described in the context of another example.

Thus there has been described a method of processing data frames for transmission on a wireless access interface of a wireless communications system, the method comprising receiving a first data frame comprising a first protocol header, the first protocol header associated with a medium access control (MAC) frame format for data transmission within a local area network (LAN), applying header compression in accordance with a header compression context to the first data frame by compressing one or more protocol header fields of the first protocol header to form a first compressed data frame for transmission on the wireless access interface, receiving a second data frame comprising a second protocol header associated with the MAC frame format, and determining that none of the fields of the second protocol header are to be compressed in accordance with the header compression context before the second data frame is transmitted on the wireless access interface.

Corresponding methods of decompressing data frames, apparatus and circuitry have also been described.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communication devices/IoT devices or other narrowband communications devices, but can be applied more generally, for example in respect of any type communications device operating with a wireless link to the communication network.

It will further be appreciated that the principles described herein are not applicable only to LTE-based wireless telecommunications systems, but are applicable for any type of wireless telecommunications system that supports an exchange data comprising headers between a communications device and a base station, or between different communications devices.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of processing data frames for transmission on a wireless access interface of a wireless communications system, the method comprising receiving a first data frame comprising a first protocol header, the first protocol header associated with a medium access control (MAC) frame format for data transmission within a local area network (LAN), applying header compression in accordance with a header compression context to the first data frame by compressing one or more protocol header fields of the first protocol header to form a first compressed data frame for transmission on the wireless access interface, receiving a second data frame comprising a second protocol header associated with the MAC frame format, and determining that none of the fields of the second protocol header are to be compressed in accordance with the header compression context before the second data frame is transmitted on the wireless access interface.

Paragraph 2. A method according to paragraph 1, the method comprising transmitting the first compressed data frame on the wireless access interface.

Paragraph 3. A method according to paragraph 1 or paragraph 2 wherein the header compression context is associated with one or more of a destination address, a data bearer, and a protocol data unit session, and where the first data frame and the second data frame are associated with the one or more of the destination address, the data bearer, and the protocol data unit session.

Paragraph 4. A method according to any of paragraphs 1 to 3, the method comprising applying header compression to the second data frame by compressing one or more protocol header fields of the second protocol header to form a second compressed data frame for transmission on a wireless access interface of the wireless communications network, the header compression being in accordance with another header compression context.

Paragraph 5. A method according to paragraph 4, the method comprising transmitting the second compressed data frame on the wireless access interface.

Paragraph 6. A method according to any of paragraphs 1 to 3, the method comprising transmitting the second data frame on the wireless access interface.

Paragraph 7. A method according to any of paragraphs 1 to 6, the method comprising retransmitting the first data frame on the wireless access interface.

Paragraph 8. A method according to any of paragraphs 1 to 7, the method comprising receiving within a receive window indications that a first number of headers have been correctly decompressed by a peer decompressor, comparing the first number with a second number, the second number representing a number of frames transmitted during a corresponding transmit window, the headers of the frames having been compressed in accordance with the context, and wherein determining that none of the fields of the second protocol header are to be compressed in accordance with the header compression context comprises determining that the first number is lower than the second number.

Paragraph 9. A method according to paragraph 8, wherein determining that none of the fields of the second protocol header are to be compressed in accordance with the header compression context comprises determining that a difference between the first number and the second number exceeds a predetermined threshold.

Paragraph 10. A method according to any of paragraphs 1 to 7, the method comprising receiving a feedback packet comprising an indication that one or more frames could not be correctly decompressed, wherein the determining that none of the fields of the second protocol header are to be compressed in accordance with the header compression context is in response to receiving the feedback packet.

Paragraph 11. A method according to paragraph 10, wherein the feedback packet comprises an indication of an identity associated with the header compression context.

Paragraph 12. A method according to paragraph 10, wherein the header compression context is associated with a first data stream, and a second header compression context is associated with a second data stream, the first and second data streams characterised by one or more of a destination address, a data bearer, and a protocol data unit session, the first and second data streams comprising data frames for transmission via the wireless access interface to a same apparatus, and the feedback packet is not associated with a single header compression context, the method comprising in response to receiving the feedback packet, determining that none of the fields of a header of a next frame of the second data stream are to be compressed in accordance with the second header compression context.

Paragraph 13. A method according to any of paragraphs 1 to 7, the method comprising after applying the header compression to the first data frame, determining that no indication that a frame has been correctly decompressed by a peer decompressor has been received before a first time, wherein the determining that none of the fields of the second protocol header are to be compressed in accordance with the header compression context is in response to the determining that no indication that a frame has been correctly decompressed by a peer decompressor has been received before the first time.

Paragraph 14. A method according to paragraph 13, wherein the first time is a predetermined duration after the applying the header compression to the first data frame.

Paragraph 15. A method according to paragraph 13, wherein the first time is a predetermined duration after the a transmission of the first compressed data frame on the wireless access interface.

Paragraph 16. A method according to any of paragraphs 1 to 15, the method comprising determining a number of consecutive frames, including the first frame, to which header compression in accordance with the header compression context has been applied, wherein the determining that none of the fields of the second protocol header are to be compressed in accordance with the header compression context is in response to determining that the number of consecutive frames exceeds a predetermined number.

Paragraph 17. A method according to any of paragraphs 1 to 16, wherein the frame format is an Ethernet or IEEE 802.3 frame format.

Paragraph 18. A method according to any of paragraphs 1 to 17, the method comprising forming a packet data convergence protocol (PDCP) protocol data unit (PDU) comprising the first compressed data frame.

Paragraph 19. A method according to any of paragraphs 1 to 18, the method comprising ciphering the first compressed data frame.

Paragraph 20. A method according to any of paragraphs 1 to 19, the method comprising applying an integrity protection function to the first compressed data frame.

Paragraph 21. A method according to any of paragraphs 1 to 20, wherein the first data frame and the second data frame are associated with a quality of service requirement for a probability of successful reception which exceeds a predetermined reliability threshold, and a quality of service requirement for a maximum permitted latency of transmission which is below a predetermined latency threshold.

Paragraph 22. A method according to any of paragraphs 1 to 21, wherein the first data frame and the second data frame are associated with an ultra reliable low latency communications (URLLC) service.

Paragraph 23. A method according to any of paragraphs 1 to 22, the method comprising receiving a third data frame which has been transmitted on the wireless access interface, the third data frame comprising a protocol header associated with the medium access control (MAC) frame format for data transmission within a local area network (LAN), the protocol header having been compressed in accordance with a third header compression context, applying header decompression in accordance with the third header compression context.

Paragraph 24. A method of processing data frames received on a wireless access interface of a wireless communications system, the method comprising receiving a first data frame which has been transmitted on the wireless access interface, the first data frame comprising a protocol header associated with the medium access control (MAC) frame format for data transmission within a local area network (LAN), the protocol header having been compressed in accordance with a first header compression context, applying header decompression in accordance with the first header compression context, receiving a second data frame which has been transmitted on the wireless access interface, the second data frame comprising a protocol header associated with the medium access control (MAC) frame format for data transmission within a local area network (LAN), the protocol header not having been compressed in accordance with the first header compression context, the second data frame associated with the first header compression context, and updating the first header compression context based on the second data frame.

Paragraph 25. Apparatus for use in a wireless communications network, the wireless communications network comprising an infrastructure equipment providing a wireless access interface, the apparatus comprising a controller configured so that the apparatus is operable: to receive a first data frame comprising a first protocol header, the first protocol header associated with a medium access control (MAC) frame format for data transmission within a local area network (LAN), to apply header compression in accordance with a header compression context to the first data frame by compressing one or more protocol header fields of the first protocol header to form a first compressed data frame for transmission on the wireless access interface, to receive a second data frame comprising a second protocol header associated with the MAC frame format, and to determine that none of the fields of the second protocol header are to be compressed in accordance with the header compression context before the second data frame is transmitted on the wireless access interface.

Paragraph 26. Apparatus according to paragraph 25, the apparatus comprising a transmitter configured to transmit data via the wireless access interface, a receiver configured to receive signals, wherein the controller is configured to control the transmitter and the receiver so that the apparatus is operable to transmit the first compressed data frame on the wireless access interface.

Paragraph 27. Apparatus according to paragraph 26, wherein the apparatus is the infrastructure equipment.

Paragraph 28. Apparatus according to paragraph 26, wherein the apparatus is a communications device.

Paragraph 29. Circuitry for an apparatus for use in a wireless communications network, the wireless communications network comprising an infrastructure equipment providing a wireless access interface, the circuitry comprising transmitter circuitry configured to transmit data via the wireless access interface, receiver circuitry configured to receive signals, and controller circuitry configured to control the transmitter circuitry and the receiver circuitry so that the apparatus is operable: to receive a first data frame comprising a first protocol header, the first protocol header associated with a medium access control (MAC) frame format for data transmission within a local area network (LAN), to apply header compression in accordance with a header compression context to the first data frame by compressing one or more protocol header fields of the first protocol header to form a first compressed data frame for transmission on the wireless access interface, to receive a second data frame comprising a second protocol header associated with the MAC frame format, and to determine that none of the fields of the second protocol header are to be compressed in accordance with the header compression context before the second data frame is transmitted on the wireless access interface.

Paragraph 30. Apparatus for use in a wireless communications network, the wireless communications network comprising an infrastructure equipment providing a wireless access interface, the apparatus comprising a controller configured so that the apparatus is operable: to receive a first data frame which has been transmitted on the wireless access interface, the first data frame comprising a protocol header associated with the medium access control (MAC) frame format for data transmission within a local area network (LAN), the protocol header having been compressed in accordance with a first header compression context, to apply header decompression in accordance with the first header compression context, to receive a second data frame which has been transmitted on the wireless access interface, the second data frame comprising a second protocol header associated with the medium access control (MAC) frame format, the second protocol header not having been compressed in accordance with the first header compression context, the second data frame associated with the first header compression context, and to update the first header compression context based on the second data frame.

Paragraph 31. Circuitry for apparatus for use in a wireless communications network, the wireless communications network comprising an infrastructure equipment providing a wireless access interface, the circuitry comprising controller circuitry configured so that the apparatus is operable: to receive a first data frame which has been transmitted on the wireless access interface, the first data frame comprising a protocol header associated with the medium access control (MAC) frame format for data transmission within a local area network (LAN), the protocol header having been compressed in accordance with a first header compression context, to apply header decompression in accordance with the first header compression context, to receive a second data frame which has been transmitted on the wireless access interface, the second data frame comprising a second protocol header associated with the medium access control (MAC) frame format, the second protocol header not having been compressed in accordance with the first header compression context, the second data frame associated with the first header compression context, and to update the first header compression context based on the second data frame.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP TS 38.300 v. 15.2.0 "NR; NR and NG-RAN Overall Description; Stage 2 (Release 15)", June 2018
[2] Holma H. and Toskala A, "LTE for UMTS OFDMA and SC-FDMA based radio access", John Wiley and Sons, 2009
[3] 3GPP document R2-1901424
[4] 3GPP document R2-1909902
[5] 3GPP document R2-2000834
[6] 3GPP TS 38.323 v.16.0.0 "3rd Generation Partnership Project; Technical Specification Group Radio Access Network; NR; Packet Data Convergence Protocol (PDCP) specification (Release 16)"

What is claimed is:

1. A method of processing data frames for transmission on a wireless access interface of a wireless communications system, the method comprising
receiving a first data frame comprising a first protocol header, the first protocol header associated with a medium access control (MAC) frame format for data transmission within a local area network (LAN),
applying header compression in accordance with a header compression context to the first data frame by compressing one or more protocol header fields of the first protocol header to form a first compressed data frame for transmission on the wireless access interface,
receiving a second data frame comprising a second protocol header associated with the MAC frame format,
determining that none of the fields of the second protocol header are to be compressed in accordance with the header compression context before the second data frame is transmitted on the wireless access interface, and
updating the header compression context based on the second data frame.

2. The method according to claim 1, the method comprising
transmitting the first compressed data frame on the wireless access interface.

3. The method according to claim 1, wherein the header compression context is associated with one or more of a destination address, a data bearer, and a protocol data unit session, and where the first data frame and the second data frame are associated with the one or more of the destination address, the data bearer, and the protocol data unit session.

4. The method according to claim 1, the method comprising
applying header compression to the second data frame by compressing one or more protocol header fields of the second protocol header to form a second compressed data frame for transmission on a wireless access interface of the wireless communications network, the header compression being in accordance with another header compression context.

5. The method according to claim 4, the method comprising
transmitting the second compressed data frame on the wireless access interface.

6. The method according to claim 1, the method comprising
transmitting the second data frame on the wireless access interface.

7. The method according to claim 1, the method comprising
retransmitting the first data frame on the wireless access interface.

8. The method according to claim 1, the method comprising
receiving within a receive window indications that a first number of headers have been correctly decompressed by a peer decompressor,
comparing the first number with a second number, the second number representing a number of frames transmitted during a corresponding transmit window, the headers of the frames having been compressed in accordance with the context, and wherein
determining that none of the fields of the second protocol header are to be compressed in accordance with the header compression context comprises determining that the first number is lower than the second number.

9. The method according to claim 8, wherein determining that none of the fields of the second protocol header are to be compressed in accordance with the header compression context comprises determining that a difference between the first number and the second number exceeds a predetermined threshold.

10. The method according to claim 1, the method comprising
receiving a feedback packet comprising an indication that one or more frames could not be correctly decompressed, wherein
the determining that none of the fields of the second protocol header are to be compressed in accordance with the header compression context is in response to receiving the feedback packet.

11. The method according to claim 10, wherein the feedback packet comprises an indication of an identity associated with the header compression context.

12. The method according to claim 10, wherein the header compression context is associated with a first data stream, and a second header compression context is associated with a second data stream,
the first and second data streams characterised by one or more of a destination address, a data bearer, and a protocol data unit session,
the first and second data streams comprising data frames for transmission via the wireless access interface to a same apparatus, and
the feedback packet is not associated with a single header compression context, the method comprising
in response to receiving the feedback packet, determining that none of the fields of a header of a next frame of the second data stream are to be compressed in accordance with the second header compression context.

13. The method according to claim 1, the method comprising
after applying the header compression to the first data frame, determining that no indication that a frame has been correctly decompressed by a peer decompressor has been received before a first time, wherein
the determining that none of the fields of the second protocol header are to be compressed in accordance with the header compression context is in response to the determining that no indication that a frame has been correctly decompressed by a peer decompressor has been received before the first time.

14. The method according to claim 13, wherein the first time is a predetermined duration after the applying the header compression to the first data frame.

15. The method according to claim 13, wherein the first time is a predetermined duration after the transmission of the first compressed data frame on the wireless access interface.

16. The method according to claim 1, the method comprising
determining a number of consecutive frames, including the first frame, to which header compression in accordance with the header compression context has been applied,
wherein the determining that none of the fields of the second protocol header are to be compressed in accordance with the header compression context is in response to determining that the number of consecutive frames exceeds a predetermined number.

17. The method according to claim 1, wherein the frame format is an Ethernet or IEEE 802.3 frame format.

18. The method according to claim 1, the method comprising
forming a packet data convergence protocol (PDCP) protocol data unit (PDU) comprising the first compressed data frame.

19. Circuitry for an apparatus for use in a wireless communications network, the wireless communications network comprising an infrastructure equipment providing a wireless access interface, the circuitry comprising
transmitter circuitry configured to transmit data via the wireless access interface,
receiver circuitry configured to receive signals, and
controller circuitry configured to control the transmitter circuitry and the receiver circuitry so that the apparatus is operable:
to receive a first data frame comprising a first protocol header, the first protocol header associated with a medium access control (MAC) frame format for data transmission within a local area network (LAN),
to apply header compression in accordance with a header compression context to the first data frame by compressing one or more protocol header fields of the first protocol header to form a first compressed data frame for transmission on the wireless access interface,
to receive a second data frame comprising a second protocol header associated with the MAC frame format,
to determine that none of the fields of the second protocol header are to be compressed in accordance with the header compression context before the second data frame is transmitted on the wireless access interface, and
to update the header compression context based on the second data frame.

20. Circuitry for an apparatus for use in a wireless communications network, the wireless communications network comprising an infrastructure equipment providing a wireless access interface, the circuitry comprising
controller circuitry configured so that the apparatus is operable:
to receive a first data frame which has been transmitted on the wireless access interface, the first data frame comprising a protocol header associated with a medium access control (MAC) frame format for data transmission within a local area network (LAN), the protocol header having been compressed in accordance with a first header compression context,
to apply header decompression in accordance with the first header compression context,
to receive a second data frame which has been transmitted on the wireless access interface, the second data frame comprising a second protocol header associated with the medium access control (MAC) frame format, the second protocol header not having been compressed in accordance with the first header compression context, the second data frame associated with the first header compression context, and
to update the first header compression context based on the second data frame.

* * * * *